(12) United States Patent
Saito et al.

(10) Patent No.: US 9,094,804 B2
(45) Date of Patent: Jul. 28, 2015

(54) WIRELESS COMMUNICATION DEVICE, WIRELESS COMMUNICATION METHOD, PROGRAM, AND WIRELESS COMMUNICATION SYSTEM

(75) Inventors: Erika Saito, Tokyo (JP); Hideyuki Suzuki, Tokyo (JP); Natsuki Itaya, Tokyo (JP); Masahiko Naito, Tokyo (JP)

(73) Assignee: Sony Corporation, Tokyo (JP)

( * ) Notice: Subject to any disclaimer, the term of this patent is extended or adjusted under 35 U.S.C. 154(b) by 278 days.

(21) Appl. No.: 12/966,280

(22) Filed: Dec. 13, 2010

(65) Prior Publication Data

US 2011/0149816 A1  Jun. 23, 2011

(30) Foreign Application Priority Data

Dec. 22, 2009 (JP) ................ P2009-290696

(51) Int. Cl.
*H04W 84/20* (2009.01)
*H04W 4/08* (2009.01)
*H04W 8/18* (2009.01)
*H04W 84/12* (2009.01)
*H04W 88/02* (2009.01)

(52) U.S. Cl.
CPC .............. *H04W 4/08* (2013.01); *H04W 8/186* (2013.01); *H04W 84/12* (2013.01); *H04W 84/20* (2013.01); *H04W 88/02* (2013.01)

(58) Field of Classification Search
CPC ...................................... H04W 84/20
USPC .................................. 370/254–255
See application file for complete search history.

(56) References Cited

U.S. PATENT DOCUMENTS

| 5,452,460 | A  | * | 9/1995  | Distelberg et al. | ............ | 719/321 |
| 8,493,992 | B2 | * | 7/2013  | Sella et al. | .................... | 370/445 |
| 2002/0055978 | A1 | * | 5/2002  | Joon-Bo et al. | ............... | 709/209 |
| 2005/0210104 | A1 | * | 9/2005  | Torvinen | ...................... | 709/205 |
| 2006/0221856 | A1 | * | 10/2006 | Quiroz | ......................... | 370/254 |

FOREIGN PATENT DOCUMENTS

JP  2008-283590  11/2008

\* cited by examiner

*Primary Examiner* — Rasheed Gidado
(74) *Attorney, Agent, or Firm* — Sherr & Jiang, PLLC

(57) ABSTRACT

Provided is a wireless communication device including a communication unit that communicates with another wireless communication device, a role determination unit that determines a role of either acting as a group owner or a client based on information of said another wireless communication device received by the communication unit, and a communication control unit that controls communication for forming a wireless communication group with said another wireless communication device, as a device that plays the role determined by the role determination unit.

14 Claims, 9 Drawing Sheets

WIRELESS COMMUNICATION DEVICE, WIRELESS COMMUNICATION METHOD, PROGRAM, AND WIRELESS COMMUNICATION SYSTEM

BACKGROUND OF THE INVENTION

1. Field of the Invention

The present invention relates to a wireless communication device, a wireless communication method, a program, and a wireless communication system.

2. Description of the Related Art

A wireless LAN (Local Area Network) system as represented by IEEE (Institute of Electrical and Electronics Engineers) 802.11 is becoming increasingly common in place of a wired network for its advantages such as high flexibility of equipment. For example, as disclosed in Japanese Unexamined Patent Publication No. 2008-283590, the wireless LAN system standardized by the IEEE 802.11 is composed of groups of wireless communication devices which are an access point operating as a master unit and a plurality of stations operating as slave units, and a plurality of stations are connected to one access point. In such a wireless LAN system, it is determined that the access point acts as a master unit and the station acts as a slave unit.

On the other hand, according to Wi-Fi Direct under Wi-Fi Alliance standard development, a plurality of equipments are connected directly to form a communication group, and, at the time of forming the communication group, it is determined which of a group owner and a client each equipment acts as. For example, each equipment exchanges a weight which indicates a priority of itself to act as the group owner with another equipment and compares its weight with a weight of the other equipment, thereby determining which of the group owner and the client it acts as.

SUMMARY OF THE INVENTION

However, because a negotiation for determining a role of each equipment is always carried out between a plurality of equipments at the time of forming a communication group, there is a concern that it takes a long time to form the communication group and enable data transmission and reception.

In light of the foregoing, it is desirable to provide a novel and improved wireless communication device, wireless communication method, program, and wireless communication system that can easily determine which of the group owner and the client the device acts as.

According to an embodiment of the present invention, there is provided a wireless communication device including a communication unit that communicates with another wireless communication device, a role determination unit that determines a role of either acting as a group owner or a client based on information of said another wireless communication device received by the communication unit, and a communication control unit that controls communication for forming a wireless communication group with said another wireless communication device, as a device that plays the role determined by the role determination unit.

The information of said another wireless communication device may include information as to which of the group owner and the client said another wireless communication device is acting as, and the role determination unit may determine to act as the client when said another wireless communication device is acting as the group owner and determines to act as the group owner when said another wireless communication device is acting as the client.

The role determination unit may determine the role of either acting as the group owner or the client by calculating a priority of the wireless communication device to act as the group owner and a priority of said another wireless communication device to act as the group owner based on the information of said another wireless communication device and comparing the priority of the wireless communication device to act as the group owner and the priority of said another wireless communication device to act as the group owner.

The information of said another wireless communication device may include information as to presence or absence of a function to act as the group owner or the client, and when said another wireless communication device has only a function to act as one of the group owner and the client, the role determination unit may determine to act as another one of the group owner and the client.

The wireless communication device may further including a connection destination selection unit that, when information of one or more than one another wireless communication device is received by the communication unit, selects any of said one or more than one another wireless communication device as a connection destination.

The connection destination selection unit may select another wireless communication device that satisfies a requested condition from an upper-layer application among said one or more than one another wireless communication device as a connection destination.

The communication control unit may control the communication unit to transmit an inquiry packet requesting a transmission of the information of said another wireless communication device.

The communication control unit may control the communication unit to transmit an inquiry packet including application information and requesting a response to another wireless communication device compatible with an application indicated by the application information.

According to another embodiment of the present invention, there is provided a wireless communication method including the steps of, receiving information of another wireless communication device from said another wireless communication device, determining a role of either acting as a group owner or a client based on the information of said another wireless communication device, and performing communication for forming a wireless communication group with said another wireless communication device, as a device that plays the determined role.

According to another embodiment of the present invention, there is provided a program causing a computer to function as a wireless communication device including, a communication unit that communicates with another wireless communication device, a role determination unit that determines a role of either acting as a group owner or a client based on information of said another wireless communication device received by the communication unit, and a communication control unit that controls communication for forming a wireless communication group with said another wireless communication device, as a device that plays the role determined by the role determination unit.

According to another embodiment of the present invention, there is provided a wireless communication system including a first wireless communication device and a second wireless communication device.

The second wireless communication device including a communication unit that communicates with the first wireless communication device, a role determination unit that determines a role of either acting as a group owner or a client based on information of the first wireless communication device received by the communication unit, and a communication control unit that controls communication for forming a wireless communication group with the first wireless communication device, as a device that plays the role determined by the role determination unit.

According to the embodiments of the present invention described above, it is possible to easily determine which of the group owner and the client the device acts as.

DETAILED DESCRIPTION OF THE EMBODIMENT(S)

Figure 1:
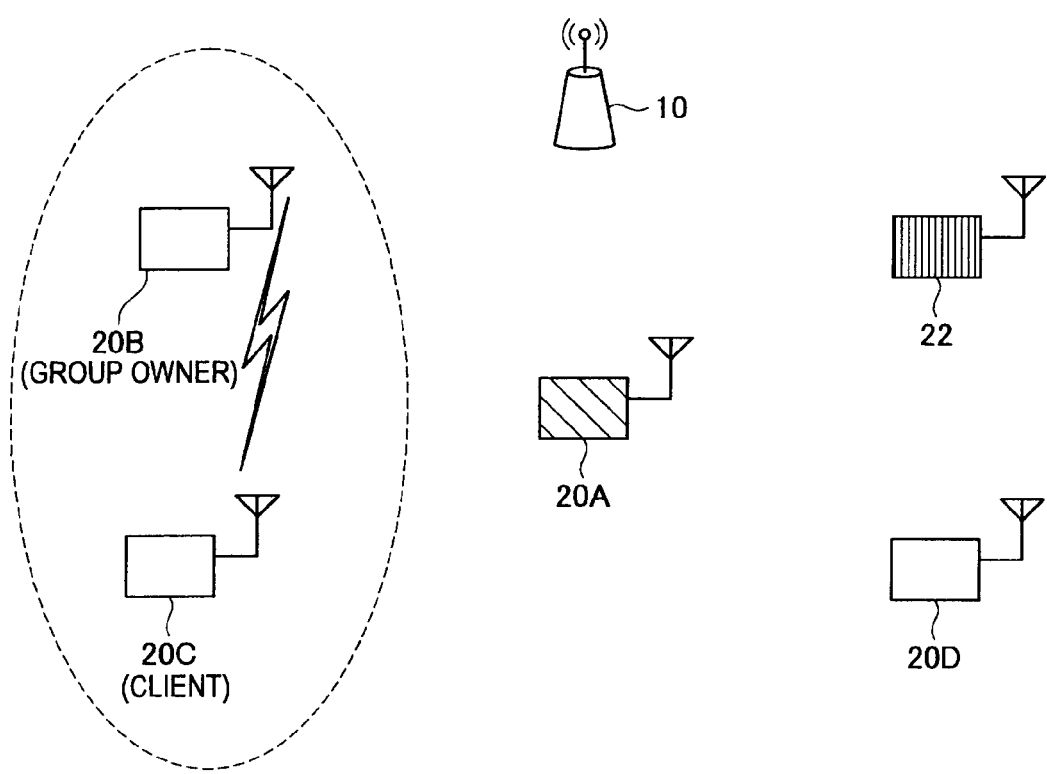
FIG. 1 is an explanatory view showing an exemplary layout of wireless nodes.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In this specification and the drawings, each of a plurality of structural elements having substantially the same function is distinguished by affixing a different alphabetical letter to the same reference numeral in some cases. For example, a plurality of structural elements having substantially the same function are distinguished like wireless communication devices 20A, 20B and 20C where necessary. However, when there is no particular need to distinguish between a plurality of structural elements having substantially the same function, they are denoted only by the same reference numeral. For example, when there is no particular need to distinguish between the wireless communication devices 20A, 20B and 20C, they are referred to simply as the wireless communication device 20.

Preferred embodiments of the present invention will be described hereinafter in the following order.

1. Overview of One Embodiment of Present Invention
2. Configuration of Wireless Communication Device
3. Operation of Wireless Communication Device
4. Specific Application Examples of Present Invention
5. Summary 1. Overview of one Embodiment of Present Invention FIG. 1 is an explanatory view showing an exemplary layout of wireless nodes. In the example shown in FIG. 1, wireless nodes such as an access point 10, a wireless communication device 20B, a wireless communication device 20C, a wireless communication device 20D and a wireless communication device 22 exist in the vicinity of a wireless communication device 20A. Further, each wireless node has a function to act as the group owner, a function to act as the client, or both of the function to act as the group owner and the function to act as the client.

For example, the access point 10 has only the function to act as the group owner. Further, the wireless communication device 22 has hardware conforming to IEEE 802.11 and has only the function to act as the client. Furthermore, the wireless communication devices 20A to 20D have both of the function to act as the group owner and the function to act as the client.

Further, in the example shown in FIG. 1, the wireless communication device 20B is acting as the group owner and forms a communication group with the wireless communication device 20C which is acting as the client. Furthermore, the wireless communication device 20D is in an unconnected state which is not connected with any of the wireless nodes.

Note that, although the wireless communication device 20 is schematically shown in FIG. 1, the wireless communication device 20 may be an information processing device such as a PC (Personal Computer), a mobile phone, a portable music playback device, a home video processing device (e.g. a DVD recorder, a videocassette recorder etc.), a home video display device, a PDA (Personal Digital Assistants), a home game device, an electrical household appliance, a portable video processing device, or a portable game device.

Hereinafter, a procedure for a plurality of wireless communication devices 24 to form a communication group is described as a comparative example of the present invention.

Figure 2:
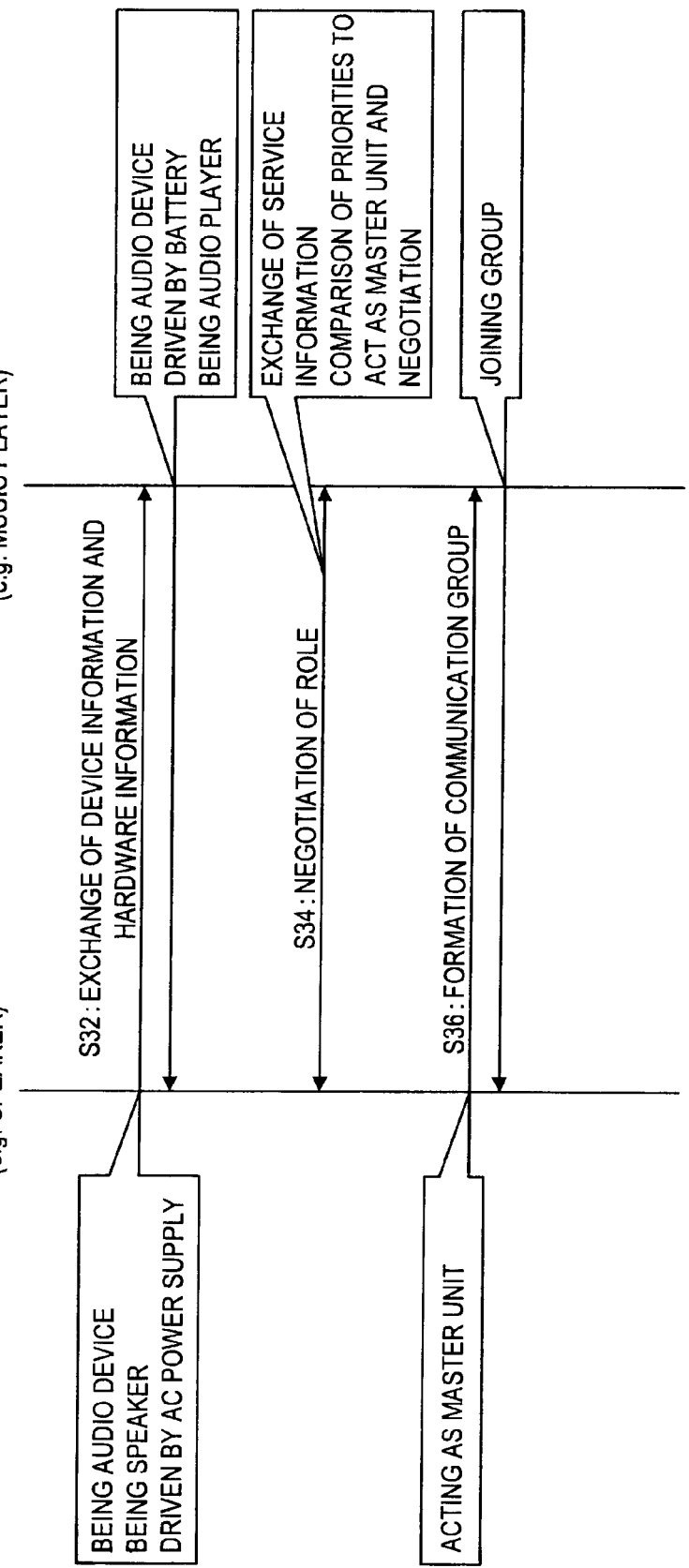
FIG. 2 is an explanatory view showing a procedure for a plurality of wireless communication devices to form a communication group according to a comparative example.

FIG. 2 is an explanatory view showing a plurality of wireless communication devices 24 to form a communication group according to the comparative example. Referring to FIG. 2, a wireless communication device 24A and a wireless communication device 24B first exchange device information, hardware information and so on with each other (S32). For example, the wireless communication device 24A notifies the wireless communication device 24B that it is an audio device, it is a speaker, and it is driven by an AC power supply and so on. Further, the wireless communication device 24B notifies the wireless communication device 24A that it is an audio device, it is driven by a battery, and it is an audio player and so on.

Next, the wireless communication device 24A and the wireless communication device 24B make a negotiation as to which of them will act as the master unit (S34). For example, each of the wireless communication device 24A and the wireless communication device 24B transmits a priority of itself to act as the master unit to the other, and compares the priority of itself to act as the master unit and the priority of the other to act as the master unit, thereby determining its role.

After that, each of the wireless communication device 24A and the wireless communication device 24B acts as the master unit or the slave unit which is determined in S34 and forms a communication group (S36). For example, when the wireless communication device 24A acts as the master unit, the wireless communication device 24A transmits a notification that it acts as the master unit to the wireless communication device 24B, and the wireless communication device 24B transmits a notification that it acts as the slave unit of the wireless communication device 24A to the wireless communication device 24A.

As described above, in the comparative example, a negotiation as to which of the wireless communication device 24A and the wireless communication device 24B will act as the master unit is performed between them. Therefore, there has been a concern that it takes a long time to form the communication group and enable data transmission and reception. Further, although a preferred role of the wireless communication device 24 varies depending on an application to be used after forming the communication group, it has been difficult to form the communication group in light of a connection mode which is most suitable for the application to be used after forming the communication group.

Under such a background, the wireless communication device 20 according to one embodiment of the present invention has been invented. The wireless communication device 20 according to one embodiment of the present invention can easily determine which of the client and the group owner it acts as when forming a communication group with another wireless node. The wireless communication device 20 is described in detail below.

2. Configuration of Wireless Communication Device

Figure 3:
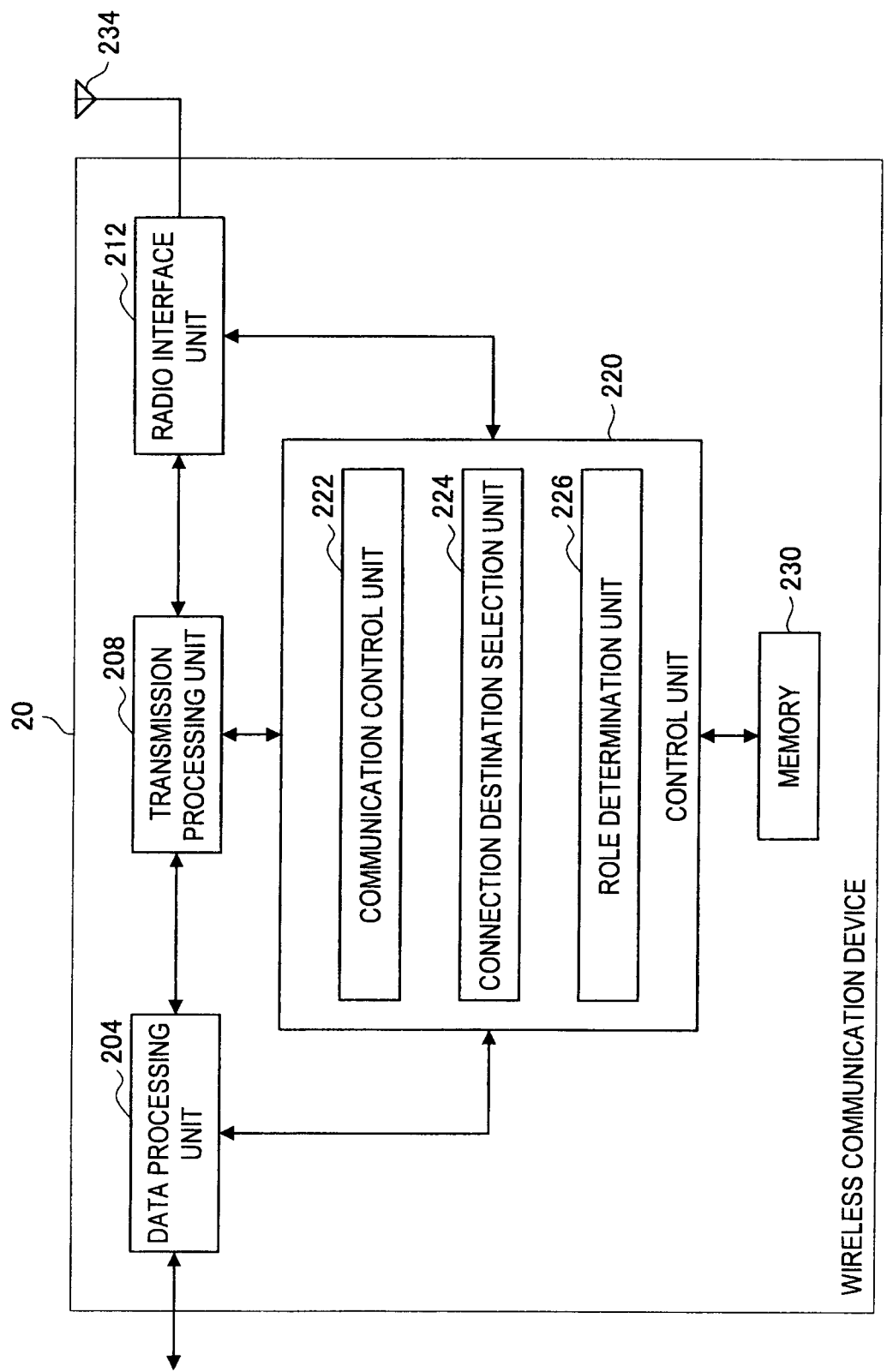
FIG. 3 is a functional block diagram showing a configuration of a wireless communication device according to an embodiment.

FIG. 3 is a functional block diagram showing a configuration of a wireless communication device 20 according to an embodiment. Referring to FIG. 3, the wireless communication device 20 includes a data processing unit 204, a transmission processing unit 208, a radio interface unit 212, a control unit 220, a memory 230, and an antenna 234.

In a transmitting operation, the data processing unit 204 creates various data frames and data packets in response to a request from an upper layer, for example, and supplies them to the transmission processing unit 208. The transmission processing unit 208 performs, during transmission, processing such as addition of various data headers or an error detecting code such as FCS (Frame Check Sequence) to the packets created by the data processing unit 204 and then provides the processed data to the radio interface unit 212. The radio interface unit 212 generates a modulation signal in a frequency band of a carrier wave from the data received from the transmission processing unit 208 and transmits the signal as a radio signal from the antenna 234.

Further, in a receiving operation, the radio interface unit 212 performs down-conversion of a radio signal received by the antenna 234 and converts the signal into a bit string to thereby decode various data frames. The transmission processing unit 208 analyzes headers added to the various data frames supplied from the radio interface unit 212 and, confirming that there is no error in the data frames based on the error detecting code, supplies the various data frames to the data processing unit 204. The data processing unit 204 processes and analyzes the various data frames and data packets supplied from the transmission processing unit 208. In this manner, the data processing unit 204, the transmission processing unit 208, the radio interface unit 212 and the antenna 234 function as a communication unit.

The control unit 220 controls the receiving operation and the transmitting operation of the data processing unit 204, the transmission processing unit 208, and the radio interface unit 212. For example, the control unit 220 performs operations such as determination of a use frequency, instruction for creation or transmission of control messages, interpretation of control messages, and connection processing control. The control messages may be annunciation information such as a beacon, an acknowledgement of a beacon, a probe request and a probe response, an inquiry packet and a response packet according to the embodiment or the like.

Further, the control unit 220 has functions as a communication control unit 222, a connection destination selection unit 224 and a role determination unit 226. The communication control unit 222 controls communication for forming a communication group with another wireless node, and the connection destination selection unit 224 selects any wireless node of the wireless nodes in the vicinity as a connection destination. The role determination unit 226 determines a role of either acting as the group owner or acting as the client when forming a communication group with another wireless node.

The memory 230 has a role of a working area of data processing by the control unit 220 and a function of a storage medium that stores various kinds of data. The memory 230 may be a storage medium such as nonvolatile memory, a magnetic disk, an optical disc or an MO (Magneto Optical) disk. Examples of the nonvolatile memory are EEPROM (Electrically Erasable Programmable Read-Only Memory), EPROM (Erasable Programmable ROM) and so on. Examples of the magnetic disk are a hard disk, a discoid magnetic disk and so on. Examples of the optical disc are CD (Compact Disc), DVD-R (Digital Versatile Disc Recordable), BD (Blu-ray Disc (registered trademark)) and so on.

3. Operation of Wireless Communication Device

Hereinafter, the operation of the wireless communication device 20 according to one embodiment of the present invention is described with reference to FIGS. 4 to 7.

Figure 4:
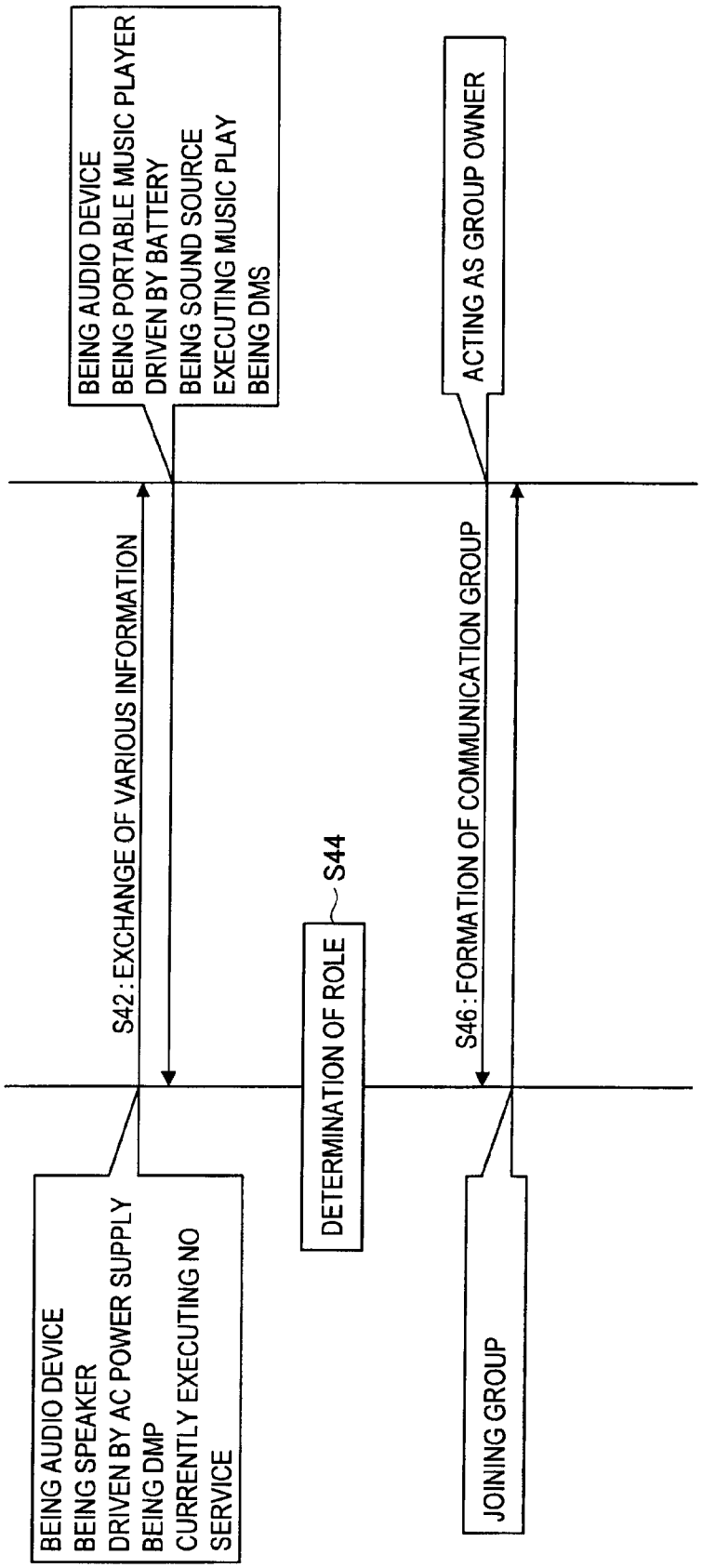
FIG. 4 is an explanatory view showing a procedure to form a communication group according to one embodiment of the present invention.

FIG. 4 is an explanatory view showing a procedure to form a communication group according to one embodiment of the present invention. Referring to FIG. 4, the wireless communication device 20A and the wireless communication device 20D first exchange various kinds of information such as service information and device information with each other (S42).

For example, the wireless communication device 20A transmits an inquiry packet that contains service information, device information and so on of its own device, and the wireless communication device 20D which has received the inquiry packet transmits a response packet that contains service information, device information and so on of its own device. Note that the case where the wireless communication device 20A exchanges information with the wireless communication device 20D is shown in FIG. 4, the wireless communication device 20A exchanges information with a plurality of wireless nodes in the vicinity. Exemplary structures of the inquiry packet and the response packet are described hereinafter with reference to FIGS. 5 and 6.

Figure 5:
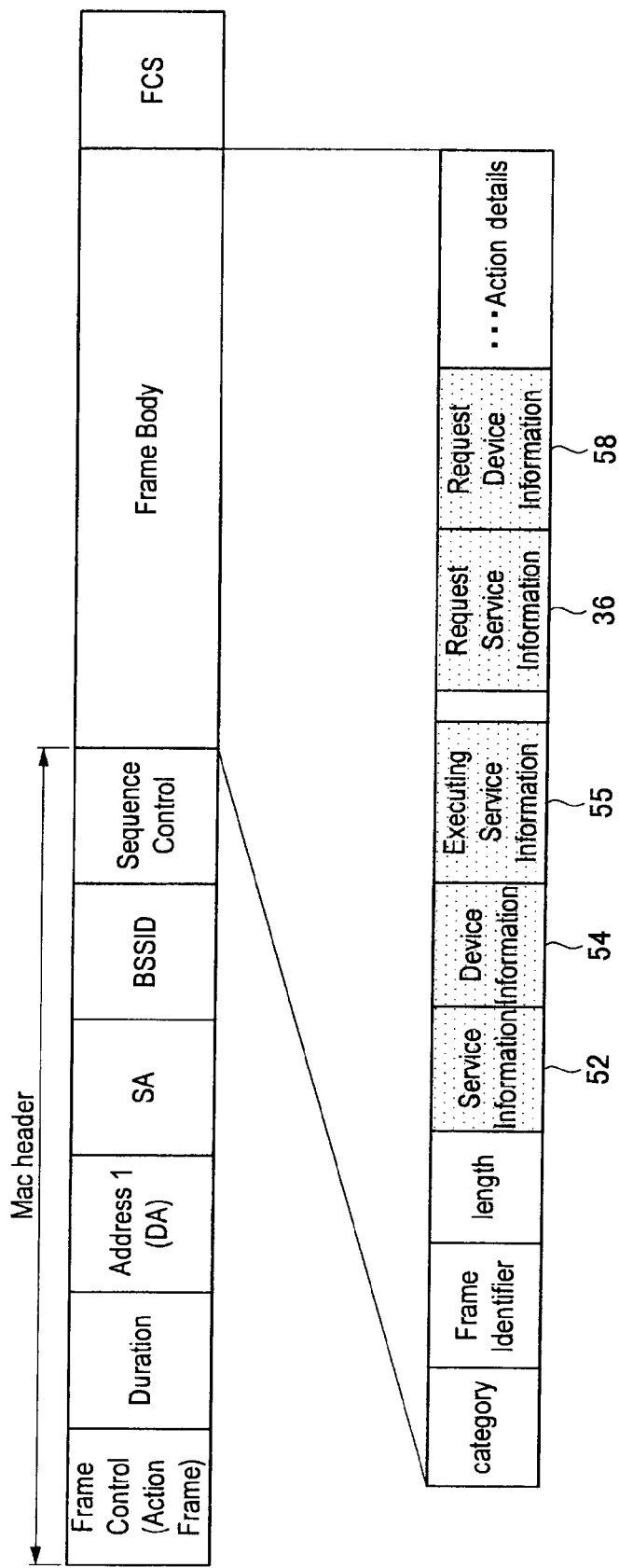
FIG. 5 is an explanatory view showing an exemplary structure of an inquiry packet.

FIG. 5 is an explanatory view showing an exemplary structure of the inquiry packet. As shown in FIG. 5, the inquiry packet includes Mac Header, Frame Body, and FCS. The Frame Body includes service information 52, device information 54, executing service information 55, request service information 56, and request device information 58. Note that the inquiry packet may conform to an action frame specified by IEEE Std 802.11-2007 or may be a probe request packet.

The service information 52 is information indicating a service (application) with which a transmission source device is compatible. In the service information 52, information indicating a DMS (Digital Media Server), information indicating a DMP (Digital Media Player), information indicating an application or the like is described, for example. Further, in the service information 52, codec information may be described as the function with which the transmission source device is compatible.

The device information 54 is information indicating a device type of a transmission source device. In the device information 54, information indicating an audio device, information indicating a portable music playback device, information indicating a speaker, information indicating battery drive, information indicating AC power drive or the like is described, for example.

The executing service information 55 is information indicating a service which a transmission source device is currently executing. In the executing service information 55, information indicating that a music playback application is currently in execution is described, for example.

The request service information 56 is information indicating a service of which execution is desired by a transmission source device. In the request service information 56, information indicating a DMS, information indicating a DMP, information indicating playback of video streaming, information indicating reading of video contents, information indicating playback of music, information indicating display of still pictures or the like is described, for example.

The request device information 58 is information indicating a device type which is requested for a device at the other end of communication by a transmission source device. In the request device information 58, as in the device information 54, information indicating an audio device, information indicating a portable music playback device, information indicating a speaker, information indicating battery drive, information indicating AC power drive or the like is described. The inquiry packet may further contain information indicating a compatible protocol, an authentication state, a channel in use, a corresponding channel, an association state, a joining group or the like.

Figure 6:
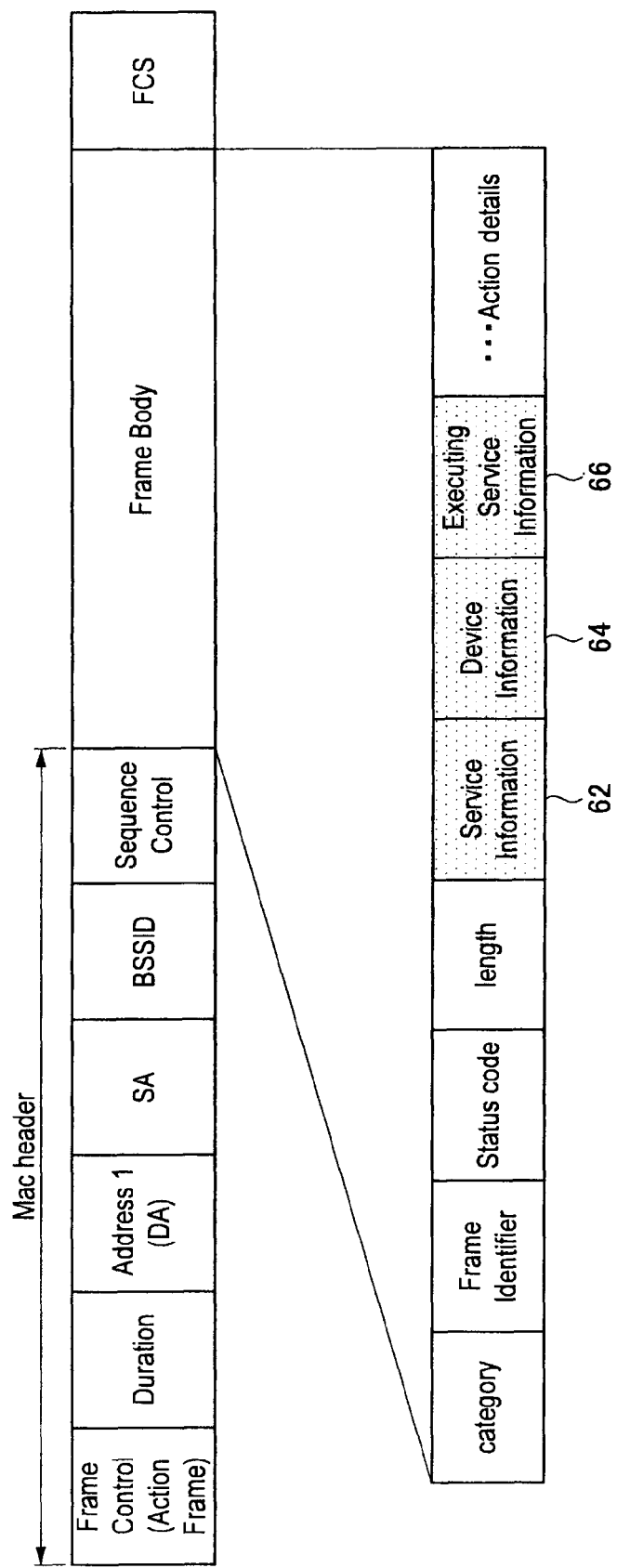
FIG. 6 is an explanatory view showing an exemplary structure of a response packet.

FIG. 6 is an explanatory view showing an exemplary structure of the response packet. As shown in FIG. 6, the response packet includes Mac Header, Frame Body, and FCS. The Frame Body includes service information 62 and device information 64 related to a transmission source device. The response packet may conform to an action frame specified by IEEE Std 802.11-2007, and, in this case, a device that has received the inquiry packet can transmit the response packet regardless of a connection state or an authentication state with another wireless node.

The service information 62 is information indicating a service (application) with which a transmission source device of the response packet is compatible. In the service information 62, information indicating a DMS, information indicating a DMP, information indicating an application or the like is described, for example. Further, in the service information 62, codec information may be described as the function with which the transmission source device is compatible.

The device information 64 is information indicating a device type of a transmission source device of the response packet. In the device information 64, information indicating an audio device, information indicating a portable music playback device, information indicating a speaker, information indicating battery drive, information indicating AC power drive or the like is described, for example.

Further, the respective wireless nodes shown in FIG. 1 may add the following information to the device information 64 when transmitting the response packet.

The access point 10: Having only the function as the group owner.

The wireless communication device 22: Having only the function as the client.

The wireless communication devices 20B and 20C: Having formed a communication group and currently in communication.

The wireless communication device 20D: Having both the function as the group owner and the function as the client.

Executing service information 66 is information indicating a service which a transmission source device of the response packet is currently executing. In the executing service information 55, information indicating that playback of a streaming content is currently in execution is described, for example. Note that the response packet may further contain information indicating a compatible protocol, an authentication state, a channel in use, a corresponding channel, an association state, a joining group or the like.

Further, the device that has received the inquiry packet may transmit the response packet only when the request service information 56 or the request device information 58 of the inquiry packet is satisfied. Alternatively, when the request service information 56 or the request device information 58 of the inquiry packet is satisfied, the device that has received the inquiry packet may transmit a notification that its own device satisfies the requested condition instead of the service information 62 and the device information 64.

Referring back to FIG. 4, the procedure to form a communication group is further described. The wireless communication device 20A records the information received from the wireless nodes in the vicinity in S42 into the memory 230. Then, based on the information recorded in the memory 230, the wireless communication device 20A selects a connection destination from the wireless nodes in the vicinity and further determines a role of either acting as the group owner or acting as the client (S44). Note that, when the wireless communication device 20A selects as the connection destination the wireless node that does not satisfy the requirement for the service which it desires to use after forming the communication group, the wireless communication device 20A may notify that to an upper-layer application before making a connection request or determining a role. The determination of a role is described later in detail with reference to FIG. 7. Further, although not shown in FIG. 4, the determination of a role may be performed also in the wireless communication device 20D.

When the wireless communication device 20A selects the wireless communication device 20D as the connection destination, the wireless communication device 20A and the wireless communication device 20D act as the group owner or the client which is determined in S44 and form a communication group (S46). For example, when the wireless communication device 20D acts as the group owner, the wireless communication device 20D notifies that it acts as the group owner to the wireless communication device 20A, and the wireless communication device 20A notifies that it acts as the client of the wireless communication device 20D to the wireless communication device 20D.

As described above, according to one embodiment of the present invention, there is no need to make a negotiation for a role between the plurality of wireless communication devices 20 (the processing of S34 in FIG. 2) when forming a communication group. It is therefore possible to reduce the time needed to form the communication group and enable data transmission and reception. The role determination process in each wireless communication device 20 for achieving the above advantageous effect is described hereinafter in detail.

Figure 7:
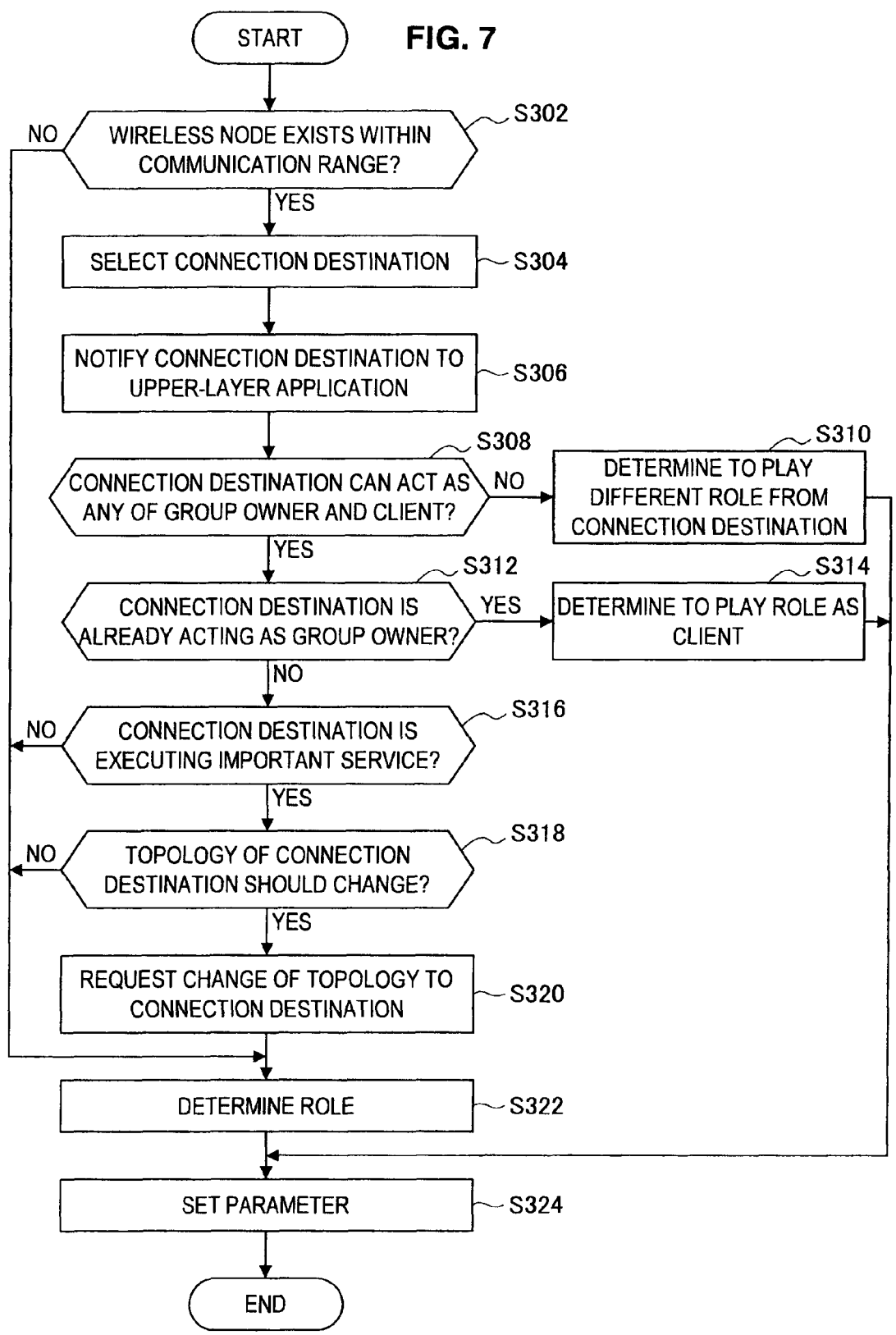
FIG. 7 is a flowchart showing a detailed flow of a role determination process by a wireless communication device.

FIG. 7 is a flowchart showing the detailed flow of the role determination process by the wireless communication device 20. The wireless communication device 20 first performs transmission and reception of the inquiry packet and the response packet. Next, when one or more than one wireless node exists within a communication range of the wireless communication device 20 (S302), the connection destination selection unit 224 selects a connection destination from the one or more than one wireless node (S304), and notifies the selected connection destination to an upper-layer application (S306). For example, the connection destination selection unit 224 may select only the wireless node which is compatible with the service or function to be executed after forming a communication group as the connection destination. On the other hand, when no wireless node exists or the wireless node which can provide the desired service does not exist within the communication range of the wireless communication device 20 (S302), the wireless communication device 20 determines to play a role as the group owner (S322), and makes parameter setting necessary for acting as the group owner (S324). After that, the wireless communication device 20 waits for a connection request from a wireless communication device which acts as the client. When a wireless node with which communication is possible is found, the communication control unit 222 controls a communication unit to transmit a connection prompt to the wireless communication device 22.

After the processing of S306, when the connection destination wireless node can act as only one of the group owner and the client (S308), the role determination unit 226 determines to play a role as the other one of the group owner and the client (S310).

For example, when the access point 10 shown in FIG. 1 is selected as the connection destination, because the access point 10 only has the function as the group owner, the role determination unit 226 determines that its own device plays a role as the client and makes parameter setting necessary for acting as the client. Then, the communication control unit 222 controls the communication unit to transmit a connection request to the access point 10.

Further, when the wireless communication device 22 shown in FIG. 1 is selected as the connection destination, because the wireless communication device 22 only has the function as the client, the role determination unit 226 determines that its own device plays a role as the group owner and makes parameter setting necessary for acting as the group owner. Then, the communication control unit 222 controls the communication unit to transmit a connection prompt to the wireless communication device 22.

On the other hand, when the connection destination wireless node can act as any one of the group owner and the client (S308), the connection destination is already acting as the group owner (S312), the role determination unit 226 determines to play a role as the client in order not to disconnect the communication by the connection destination.

For example, when the wireless communication device 20B shown in FIG. 1 is selected as the connection destination, because the wireless communication device 20B is acting as the group owner and in communication with the wireless communication device 20C, the role determination unit 226 determines that its own device plays a role as the client in order not to disconnect the communication by the wireless communication device 20B. Then, after the role determination unit 226 makes parameter setting necessary for acting as the client, the communication control unit 222 controls the communication unit to transmit a connection request to the wireless communication device 20B.

Then, when the connection destination is executing an important service (S316) and it is necessary to change the topology of the connection destination (S318), the wireless communication device 20 transmits a request for changing the topology to the connection destination (S320), and determines a role based on the collected information.

For example, when the wireless communication device 20C which is acting as the client shown in FIG. 1 is selected as the connection destination and the wireless communication device 20C is executing an important service, the wireless communication device 20A acts so that the communication of the wireless communication device 20C is not disconnected.

Specifically, when the wireless communication device 20C has the function to act as the client for the wireless communication device 20B and act as the group owner for the wireless communication device 20A, the role determination unit 226 determines to play a role as the client. Further, when the wireless communication device 20C has the function to act as the client for the wireless communication device 20B and act as the client also for the wireless communication device 20A, the role determination unit 226 determines to play a role as the group owner. On the other hand, when the wireless communication device 20C does not have the function to act as the client for the wireless communication device 20B and act as the group owner or the client for the wireless communication device 20A, the wireless communication device 20A requests a change of the topology (the structure of the communication group) to the wireless communication device 20C.

Further, when the wireless communication device 20D shown in FIG. 1 is selected as the connection destination, the role determination unit 226 may determine a role by calculating the priority of the wireless communication device 20A to act as the group owner and the priority of the wireless communication device 20D to act as the group owner from device information of the wireless communication device 20D and feature information of a service or the like to be executed after connection and then comparing the priorities of the both devices.

Alternatively, when the wireless communication device 20A and the wireless communication device 20D have been connected with each other in the past and the past connection history is recorded in the memory 230, the role determination unit 226 may determine that the wireless communication device 20A plays the same role as in the past connection. Alternatively, when the past connection history is not recorded in the memory 230, the role determination unit 226 may determine a role by making a negotiation for a role with the wireless communication device 20D.

After determining the role in the above manner, the role determination unit 226 makes parameter setting for playing the determined role (S324). After that, the processing of S46 shown in FIG. 4 is performed.

4. Specific Application Examples of Present Invention

Hereinafter, specific application examples of the present invention are described with reference to FIGS. 8 and 9.

First Application Example

Figure 8:
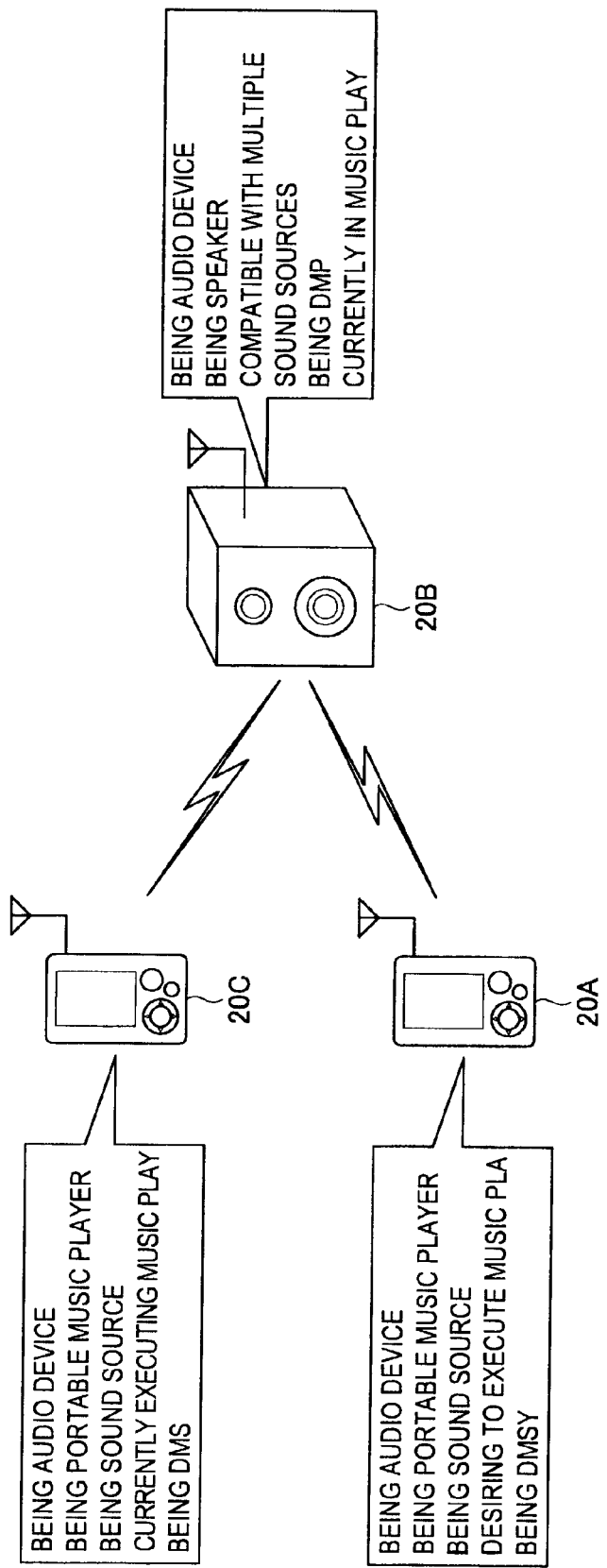
FIG. 8 is an explanatory view showing a first specific application example of the present invention.

FIG. 8 is an explanatory view showing a first specific application example of the present invention. Music players 20A and 20C and a speaker 20B shown in FIG. 8 have the function of the wireless communication device 20 described above. Further, the music players 20A and 20C are sound sources, and the case of intending to sequentially play the music of the music players 20A and 20C through the speaker 20B (music play) is assumed.

Further, it is assumed that the music player 20C and the speaker 20B have already formed the communication group, and the music player 20C acts as the client, and the speaker 20B acts as the group owner.

In this case, the music player 20A performs transmission and reception of the inquiry packet and the response packet with the speaker 20B in order for the speaker 20B to execute the music play service. As a result, it is found that the service is already executed, with the music player 20C acting as the DMS and the speaker 20B acting as the DMP. On the other hand, the music player 20A desires to execute the music play service, acting as the DMS.

Because the sound of the music players 20A and 20C needs to be output sequentially, it can be determined that the speaker 20B which manages the output should become the group owner. Therefore, the music player 20A transmits a topology change request to the music player 20C. Receiving the topology change request, the music player 20C stops playing the music and disconnects the connection with the speaker 20B. Then, it is determined that the music players 20A and 20C act as the clients and the speaker 20B acts as the group owner, thereby forming a new communication group.

Alternatively, in the case where the music player 20C responds to the topology change request after the end of the music being played, the music player 20C notifies that to the music player 20A and disconnects the connection with the speaker 20B when the music being played ends. Then, it is determined that the music players 20A and 20C act as the clients and the speaker 20B acts as the group owner, thereby performing communication for forming a new communication group.

Second Application Example

Figure 9:
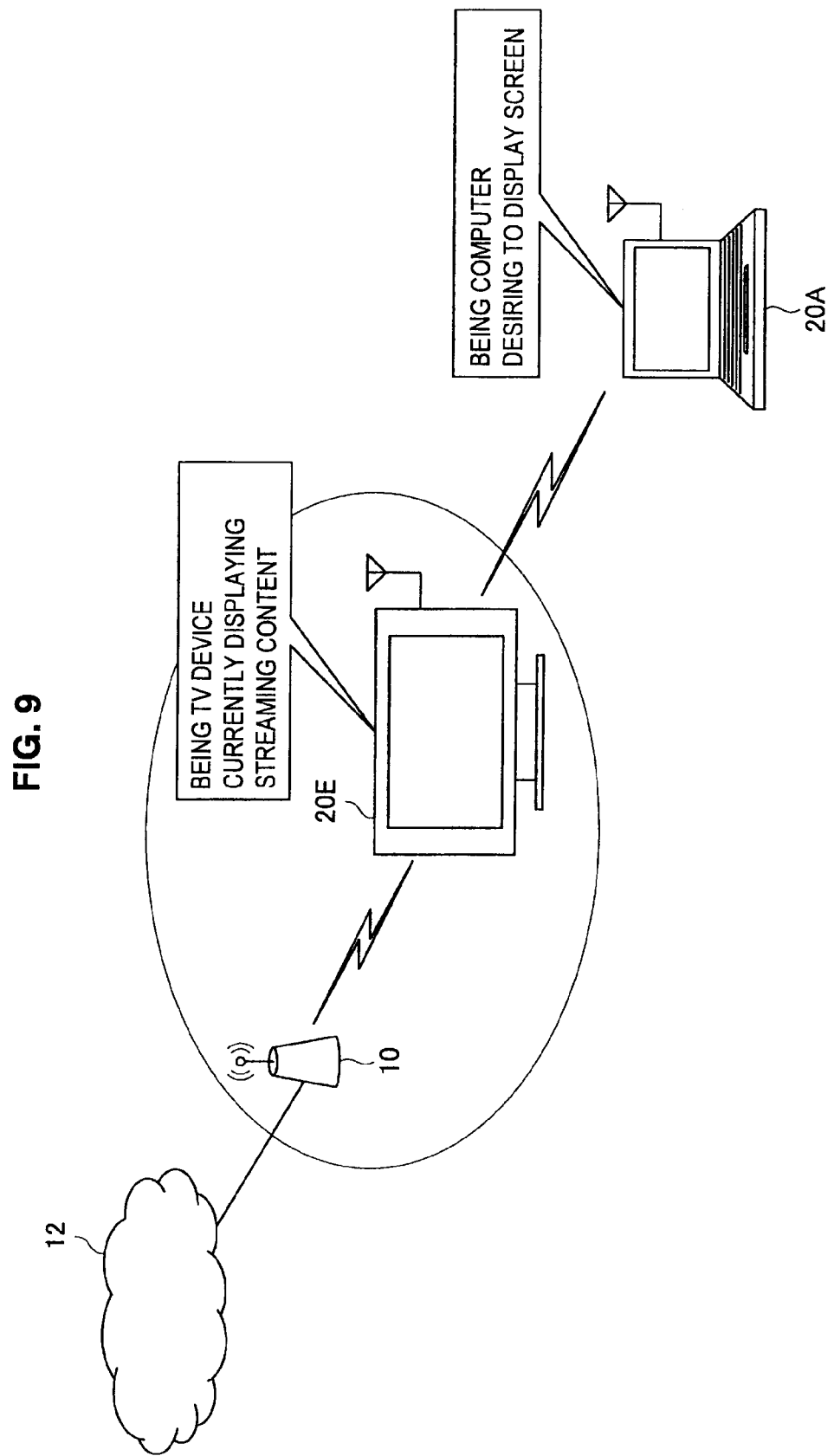
FIG. 9 is an explanatory view showing a second specific application example of the present invention.

FIG. 9 is an explanatory view showing a second specific application example of the present invention. A computer 20A and a television device 20E shown in FIG. 9 have the function of the wireless communication device 20 described above. Further, the television device 20E has already formed a communication group with the access point 10 connected to the Internet 12, and the access point 10 is acting as the group owner and the television device 20E is acting as the client. Further, it is assumed that the television device 20E is playing a content which is distributed through the Internet 12, and a user is viewing the played content.

The case of intending to display a screen of the computer 20A on the television device 20E, i.e. to use the television device 20E as a display of the computer 20A is assumed.

In this case, the computer 20A and the television device 20E inform a service with which it is compatible, device information, desired service information, a service in execution or the like to each other by using the inquiry packet and the response packet.

For example, the television device 20E transmits a packet indicating that the service with which it is compatible is still picture display, video display or the like, and the service in execution is video display. Further, the computer 20A transmits a packet indicating that the desired service is display of a computer screen. The computer 20A and the television device 20E can be thereby informed of the function of the other device, the service execution state, the desired service or the like.

Then, when the television device 20E has the function of forming a new communication group by acting as the client for the computer 20A while maintaining the connection with the access point, it is determined that the television device 20E acts as the group owner. After that, the television device 20E prompts the computer 20A to join the communication group and performs communication for the computer 20A to join the communication group as the client.

5. Summary

As described above, according to one embodiment of the present invention, there is no need to make a negotiation for a role between the plurality of wireless communication devices 20 when forming a communication group. It is therefore possible to reduce the time needed to form the communication group and enable data transmission and reception.

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

Further, it is not always necessary to perform the steps in the processing of the wireless communication device 20 of this specification in chronological order according to the sequence shown in the sequence charts or flowcharts. For example, the steps in the processing of the wireless communication device 20 may be processed in a different sequence from the sequence shown in the flowcharts or may be processed in parallel.

Furthermore, it is possible to create a computer program that causes hardware such as a CPU, ROM and RAM incorporated in the wireless communication device 20 to perform the equal functions to the elements of the wireless communication device 20 described above. Further, a storage medium that stores such a computer program may be provided.

The present application contains subject matter related to that disclosed in Japanese Priority Patent Application JP 2009-290696 filed in the Japan Patent Office on Dec. 22, 2009, the entire content of which is hereby incorporated by reference.

What is claimed is:

1. A wireless communication device comprising:
    a communication unit that communicates with another wireless communication device;
    a role determination unit that determines a role of either acting as a group owner or a client based on information of said another wireless communication device received by the communication unit, wherein the information comprises a device information, a service information and a request service information, wherein the information of said another wireless communication device includes information as to presence or absence of a function to act as the group owner or the client; and
    a communication control unit that controls communication for forming a wireless communication group with said another wireless communication device, as a device that plays the role determined by the role determination unit, wherein the communication control unit controls the communication unit to transmit an inquiry packet including application information and requesting a response to another wireless communication device compatible with an application indicated by the application information, and
    wherein the service information indicates an application compatible with the another wireless communication device and the request service information indicates a service of which execution is desired by the another wireless communication device.

2. The wireless communication device according to claim 1, wherein
the information of said another wireless communication device includes information as to which of the group owner and the client said another wireless communication device is acting as, and
the role determination unit determines to act as the client when said another wireless communication device is acting as the group owner and determines to act as the group owner when said another wireless communication device is acting as the client.

3. The wireless communication device according to claim 1, wherein the role determination unit determines the role of either acting as the group owner or the client by calculating a priority of the wireless communication device to act as the group owner and a priority of said another wireless communication device to act as the group owner based on the information of said another wireless communication device and comparing the priority of the wireless communication device to act as the group owner and the priority of said another wireless communication device to act as the group owner.

4. The wireless communication device according to claim 1, wherein
when said another wireless communication device has only a function to act as one of the group owner and the client, the role determination unit determines to act as another one of the group owner and the client.

5. The wireless communication device according to claim 1, further comprising:
a connection destination selection unit that, when information of one or more than one another wireless communication device is received by the communication unit, selects any of said one or more than one another wireless communication device as a connection destination.

6. The wireless communication device according to claim 5, wherein the connection destination selection unit selects another wireless communication device that satisfies a requested condition from an upper-layer application among said one or more than one another wireless communication device as a connection destination.

7. The wireless communication device according to claim 5, wherein the communication control unit controls the communication unit to transmit an inquiry packet requesting a transmission of the information of said another wireless communication device.

8. The wireless communication device according to claim 1, wherein the communication is according to IEEE 802.11 communication protocols.

9. A wireless communication method comprising the steps of:
receiving information of another wireless communication device from said another wireless communication device, wherein the information comprises a device information, a service information and a request service information, wherein the information of said another wireless communication device includes information as to presence or absence of a function to act as the group owner or the client;
determining a role of either acting as a group owner or a client based on the information of said another wireless communication device;
performing communication for forming a wireless communication group with said another wireless communication device, as a device that plays the determined role; and
transmitting an inquiry packet including application information and requesting a response to the another wireless communication device compatible with an application indicated by the application information, and
wherein the service information indicates an application compatible with the another wireless communication device and the request service information indicates a service of which execution is desired by the another wireless communication device.

10. A program embodied on a non-transitory computer readable medium that, when executed by a processor, causes a computer to function as a wireless communication device comprising:
a communication unit that communicates with another wireless communication device;
a role determination unit that determines a role of either acting as a group owner or a client based on information of said another wireless communication device received by the communication unit, wherein the information comprises a device information, a service information and a request service information, wherein the information of said another wireless communication device includes information as to presence or absence of a function to act as the group owner or the client; and
a communication control unit that controls communication for forming a wireless communication group with said another wireless communication device, as a device that plays the role determined by the role determination unit, wherein the communication control unit controls the communication unit to transmit an inquiry packet including application information and requesting a response to another wireless communication device compatible with an application indicated by the application information, and
wherein the service information indicates an application compatible with the another wireless communication device and the request service information indicates a service of which execution is desired by the another wireless communication device.

11. A wireless communication system comprising:
a first wireless communication device;
a second wireless communication device including a communication unit that communicates with the first wireless communication device;
a role determination unit that determines a role of either acting as a group owner or a client based on information of the first wireless communication device received by the communication unit, wherein the information comprises a device information, a service information and a request service information, wherein the information of the first wireless communication device includes information as to presence or absence of a function to act as the group owner or the client; and
a communication control unit that controls communication for forming a wireless communication group with the first wireless communication device, as a device that plays the role determined by the role determination unit, wherein the communication control unit controls the communication unit to transmit an inquiry packet including application information and requesting a response to another wireless communication device compatible with an application indicated by the application information, and
wherein the service information indicates an application compatible with the first wireless communication device and the request service information indicates a service of which execution is desired by the first wireless communication device.

12. The wireless communication method according to claim 9, wherein the communication is according to IEEE 802.11 communication protocols.

13. The program according to claim 10, wherein the communication is according to IEEE 802.11 communication protocols.

14. The wireless communication system according to claim 11, wherein the communication is according to IEEE 802.11 communication protocols.

* * * * *